No. 831,483. PATENTED SEPT. 18, 1906.
A. STEINBRECKER.
NECK YOKE COUPLING.
APPLICATION FILED FEB. 7, 1906.
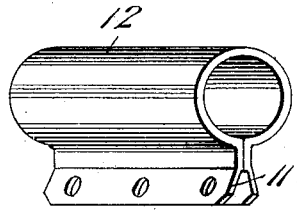
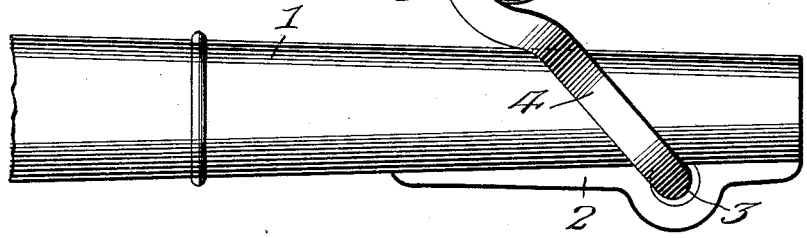
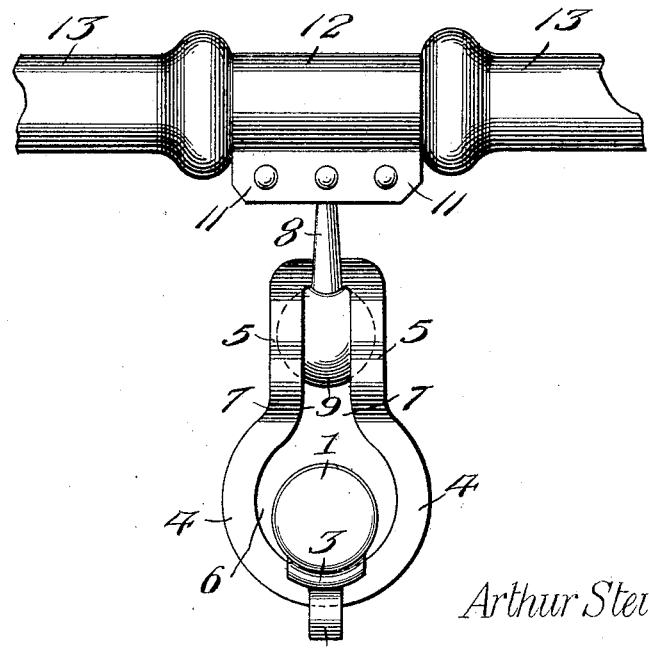
Witnesses
Frank B. Hoffman
C. A. Ege
Inventor
Arthur Steinbrecker,
By Victor J. Evans
Attorney
THE NORRIS PETERS CO., WASHINGTON, D. C.

UNITED STATES PATENT OFFICE.

ARTHUR STEINBRECKER, OF DENHOFF, NORTH DAKOTA.

NECK-YOKE COUPLING.

No. 831,483.          Specification of Letters Patent.          Patented Sept. 18, 1906.

Application filed February 7, 1906. Serial No. 299,999.

*To all whom it may concern:*

Be it known that I, ARTHUR STEINBRECKER, a citizen of the United States, residing at Denhoff, in the county of McLean and State of North Dakota, have invented new and useful Improvements in Neck-Yoke Couplings, of which the following is a specification.

This invention relates to neck-yoke couplings, and has for its objects to produce a comparatively simple inexpensive device of this character which will securely couple the yoke to a vehicle-pole, one whereby free movement of the yoke relative to the pole will be permitted and one in which the yoke may be readily connected with or disconnected from the pole and its accidental disconnection be prevented.

With these and other objects in view the invention comprises the novel features of construction and combination of parts more fully hereinafter described.

In the accompanying drawings, Figure 1 is a side elevation of the forward portion of the vehicle-tongue equipped with a yoke-coupling embodying the invention. Fig. 2 is a front elevation of the same. Fig. 3 is a perspective view of the yoke-clip.

Referring to the drawings, 1 designates a vehicle tongue or pole equipped at its forward end with a bearing member 2, having a transverse bearing-opening 3, in which is pivoted a coupling member or link 4, preferably of the form shown and having its elongated portion or extension 5 curved forwardly in a plane at right angles to the transverse axis of the member, there being provided in the link a keyhole-opening 6, the slot 7 of which extends longitudinally of the portion 5.

Detachably engaged with the female coupling member 4 is a male coupling member 8, having a ball-head 9, adapted for entrance through the opening 6, there being provided at the normally upper end of the member 8 a cross bar or head 10, adapted to fit and be riveted or otherwise secured between a pair of flanges 11, formed upon a cylindrical tubular clip 12, in which is fitted a neck-yoke 13.

In practice the head 9 of coupling member 8 is entered through the opening 6, which receives the pole 1, and moved into the slot 7 for engagement with the curved extension 5, thus to connect the yoke 13 with the pole, it being apparent that the parts may be readily disconnected when circumstances require by swinging the member 4 forwardly and moving the ball downward through the slot and outward through the opening 6. It is obvious that when the parts are in coupled engagement the ball 9 will turn freely on the curved bearing-face of the extension 5 and the member 4 swing freely in the bearing 2 to permit free relative movement of the tongue and yoke, and, further, that the curved extension 5 constitutes, in effect, a socket or recess in which the ball-head 9 is adapted for universal movement. When the parts are in normal active position, as seen in Fig. 1, the pole 1 effectually closes the opening 6 and prevents escape of the member 13 from the member 4, as will be understood.

From the foregoing it is apparent that I produce a simple device admirably adapted for the attainment of the ends in view, it being understood that in attaining these ends minor changes in the details herein set forth may be resorted to without departing from the spirit of the invention.

Having thus described my invention, what I claim is—

1. In a device of the class described and in combination with a pole and neck-yoke, of a female coupling member connected with one of said parts and comprising an annular portion and an elongated extension having a slot communicating with said annular portion, said elongated extension being curved longitudinally to form a bearing-recess, and a male coupling member connected with the other of said parts and having a spherical head designed for entrance through the annular portion into the slot and to seat within the bearing-recess.

2. In a device of the class described and in combination with a pole and neck-yoke, of a coupling member having an annular portion to receive and encircle the pole and an elongated extension having a slot communicating with said annular portion, the elongated extension being curved forwardly and longitudinally to form a bearing-recess, and a second coupling member connected with the yoke and having a spherical head designed for entrance through the annular portion into the slot and to seat within the bearing-recess.

In testimony whereof I affix my signature in presence of two witnesses.

ARTHUR STEINBRECKER.

Witnesses:
    J. W. HEMPEL,
    GEORGE McFADDEN.